(12) United States Patent
Glass

(10) Patent No.: US 8,233,506 B2
(45) Date of Patent: Jul. 31, 2012

(54) CORRELATION TECHNIQUE FOR DETERMINING RELATIVE TIMES OF ARRIVAL/DEPARTURE OF CORE INPUT/OUTPUT PACKETS WITHIN A MULTIPLE LINK-BASED COMPUTING SYSTEM

(75) Inventor: Richard J. Glass, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/041,153

(22) Filed: Mar. 4, 2011

(65) Prior Publication Data

US 2011/0161714 A1 Jun. 30, 2011

Related U.S. Application Data

(63) Continuation of application No. 11/026,907, filed on Dec. 30, 2004, now Pat. No. 7,903,560.

(51) Int. Cl.
*H04J 3/06* (2006.01)

(52) U.S. Cl. ....................................... 370/503

(58) Field of Classification Search ......................... None
See application file for complete search history.

(56) References Cited

U.S. PATENT DOCUMENTS

| | | | |
|---|---|---|---|
| 5,369,640 A | 11/1994 | Watson et al. | |
| 5,717,729 A | 2/1998 | Iknaian et al. | |
| 6,009,488 A | 12/1999 | Kavipurapu | |
| 6,044,400 A | 3/2000 | Golan et al. | |
| 6,266,799 B1 * | 7/2001 | Lee et al. | 716/113 |
| 6,535,489 B1 | 3/2003 | Merchant et al. | |
| 6,732,200 B1 * | 5/2004 | Aoki | 710/60 |
| 7,096,261 B2 | 8/2006 | Abrol et al. | |
| 7,613,212 B1 * | 11/2009 | Raz et al. | 370/510 |
| 2003/0063625 A1 * | 4/2003 | Belk et al. | 370/503 |
| 2004/0153813 A1 | 8/2004 | Swoboda | |
| 2005/0163273 A1 * | 7/2005 | Scheffel | 375/354 |
| 2006/0136768 A1 * | 6/2006 | Liu et al. | 713/400 |
| 2008/0080562 A1 * | 4/2008 | Burch et al. | 370/503 |
| 2008/0133880 A1 | 6/2008 | Alba Pinto et al. | |

* cited by examiner

*Primary Examiner* — Raj Jain
(74) *Attorney, Agent, or Firm* — Blakely, Sokoloff, Taylor & Zafman LLP

(57) ABSTRACT

A method is described that comprises receiving a timing exposure packet having timestamp information. The timestamp information identifies a cycle of a clock signal at which the packet was made available for transfer from a core to a physical layer within a component of a link-based computing system. The packet having been transmitted from the physical layer and also having phase information. The phase information identifies a cycle of the clock signal at which the packet was transferred from the core to the physical layer.

20 Claims, 8 Drawing Sheets

CORRELATION TECHNIQUE FOR DETERMINING RELATIVE TIMES OF ARRIVAL/DEPARTURE OF CORE INPUT/OUTPUT PACKETS WITHIN A MULTIPLE LINK-BASED COMPUTING SYSTEM

CLAIM TO PRIORITY

This application is a Continuation of patent application Ser. No. 11/026,907, entitled, "CORRELATION TECHNIQUE FOR DETERMINING RELATIVE TIMES OF ARRIVAL/DEPARTURE OF CORE INPUT/OUTPUT PACKETS WITHIN A MULTIPLE LINK-BASED COMPUTING SYSTEM", filed Dec. 30, 2004 now U.S. Pat. No. 7,903,560.

FIELD OF INVENTION

The field of invention relates generally to the testing of multiple-link-based computing systems; and, more specifically, to a correlation technique for determining precise relative times of arrival/departure at device core clock domain boundary for input/output packets within a multiple-link-based computing system.

BACKGROUND

FIG. 1a shows a depiction of a bus 120. A bus 120 is a "shared medium", multi-drop communication structure that is used to transport communications between electronic components 101a-10Na and 110a. Shared medium means that the components 101a-10Na and 110a that communicate with one another physically share and are connected to the same parallel signals electronic wiring composing bus 120. That is, wiring 120 is a shared resource that is used by any of components 101a-10Na and 110a to communicate with any other of components 101a-10Na and 110a. For example, if component 101a wished to communicate to component 10Na, component 101a would send information along wiring 120 to component 10Na; if component 103a wished to communicate to component 110a, component 103a would send information along the same wiring 120 to component 110a, etc.

Computing systems have traditionally made use of multi-drop busses. For example, with respect to certain IBM compatible PCs, bus 120 corresponds to a PCI bus where components 101a-10Na correspond to "I/O" components (e.g., LAN networking adapter cards, MODEMs, hard disk storage devices, etc.) and component 110a corresponds to an I/O Control Hub (ICH). As another example, with respect to certain multiprocessor computing systems, bus 120 corresponds to a "front side" bus where components 101a-10Na correspond to microprocessors and component 110a corresponds to a memory controller and bridge to I/O buses.

For multi-drop buses, information is transferred synchronously (with respect to a single clock edge, multiple clock edges, or even using source agent transmitted strobe edges) over parallel signal conductors such that external bus monitoring tools (logic analyzers) electrically attached to the bus are able to record precisely what the device transmits and senses on the bus at each relevant clock edge. As result, there is no ambiguity between externally captured trace content vs the synchronous input/output values internal to the bus agents.

Owing to artifacts referred to as "capacitive loading" and "non-uniform transmission line signal integrity degradation", busses are less and less practical as computing system speeds grow. Basically, as the capacitive loading of any wiring increases, the maximum speed at which that wiring can transport information decreases. That is, there is an inverse relationship between a wiring's capacitive loading and that same wiring's speed. Each component that is added to a wire causes that wire's capacitive loading to grow. Likewise, at increased frequencies, transmission lines forming the bus experience increased signal integrity degradation as result of topology complexities (discontinuities at branches and any other points where the impedance of the transmission line changes), high frequency losses in dielectrics, inter-signal coupling, and other high frequency effects. Thus, because multi-drop busses typically couple multiple components, bus wiring 120 is typically regarded as being heavily loaded with capacitance as well as having other transfer rate limiting signal degradation problems.

In the past, when computing system clock speeds were relatively slow (for example, below 100 MHz), the capacitive loading and other degrading effects on the computing system's busses were not serious issues because the degraded maximum speed of the bus wiring (owing to capacitive loading and other degrading effects) were still a fair match for transfer rates necessary to accommodate the computing system's internal clock speeds. The same cannot be said for many of today's computing systems. That is, with the continual increase in computing system clock speeds over the years, the speed of today's computing systems are reaching (and/or perhaps exceeding) the maximum speed capabilities of wires that are heavily loaded with capacitance and/or exhibit other high frequency degradation effects (such as bus wiring 120).

Therefore computing systems are migrating to "link-based" component-to-component interconnection schemes. FIG. 1b shows a comparative example of a point to point links interconnected system vis-à-vis the multi-drop configuration in FIG. 1a. According to the approach of FIG. 1b, computing system components 101a-10Na and 110a are interconnected through a network 140 of high speed point-to-point links $130_1$ through $130_N$. Each point-to-point link comprises a first unidirectional point-to-point link that transmits information in a first direction and a second unidirectional point-to-point link that transmits information is a second direction that is opposite that of the first direction. Because a unidirectional point-to-point link typically has a single endpoint at each end, and a simple unbranched topology, its capacitive loading and other high frequency degradation effects are substantially less than that of a shared media bus.

Each unidirectional point-to-point link can be constructed with copper or fiber optic cabling and appropriate drivers and receivers (e.g., single or differential line drivers and receivers for copper based cables; and LASER or LED Electrical/Optical transmitters and Optical/Electrical receivers for fiber optic cables; etc.). The network 140 observed in FIG. 1b is simplistic in that each component is connected by a point-to-point link to every other component.

In more complicated schemes, the network 140 has additional elements such as link repeaters and/or routing/switching nodes. Here, every component need not be coupled by a point-to-point link to every other component. Instead, hops across a plurality of links may take place through repeaters and/or routing/switching nodes in order to transport information from a source component to a destination component. Depending on implementation, repeaters and routing/switching functions may be stand alone functions within the network or may be integrated into substantive components of the computing system (e.g., processor, memory controller, I/O unit, etc.).

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the testing and verification of electronic circuitry 201, inputs $202_1$-$202_X$ are applied to the circuitry 201 and outputs $203_1$-$203_Y$ produced in response from the circuitry 201, with both inputs and outputs monitored (traced). Typically, the electronic circuitry 201 is modeled and specific outputs produced in response to specific inputs are simulated. When the electronic circuitry 201 is actually constructed, these same inputs $202_1$-$202_X$ can be applied to the circuitry and the actual outputs produced by the circuitry in response are observed. If the actual outputs $203_1$-$203_Y$ of the constructed circuitry "match" the simulated outputs of the modeled circuitry, the designers of the circuitry have a high level of confidence in their understanding of the inner workings of the circuitry 201 (at least as to the instance of how the circuitry behaves in response to the particular inputs $202_1$-$202_X$ that were applied). The abstracted circuitry 201 can be a relatively arbitrary partition of an overall system, as long at the full set of inputs and outputs of that partition can be observed/traced for analysis.

Troubleshooting, verification and other aspects of functional characterization of electronic circuitry can often be broken down into one or more instances of applying specific inputs $202_1$-$202_X$ and observing the specific outputs $203_1$-$203_Y$ of the circuitry in response thereto. Because the inputs $202_1$-$202_X$ and outputs $203_1$-$203_Y$ can be viewed as having both informational and temporal components (i.e., what is applied/produced and when it is applied/produced), knowledge of both are essential in the development and assessment of behavior of electronic systems that contain electronic circuitry (such as a link-based computing system).

Figure 3:
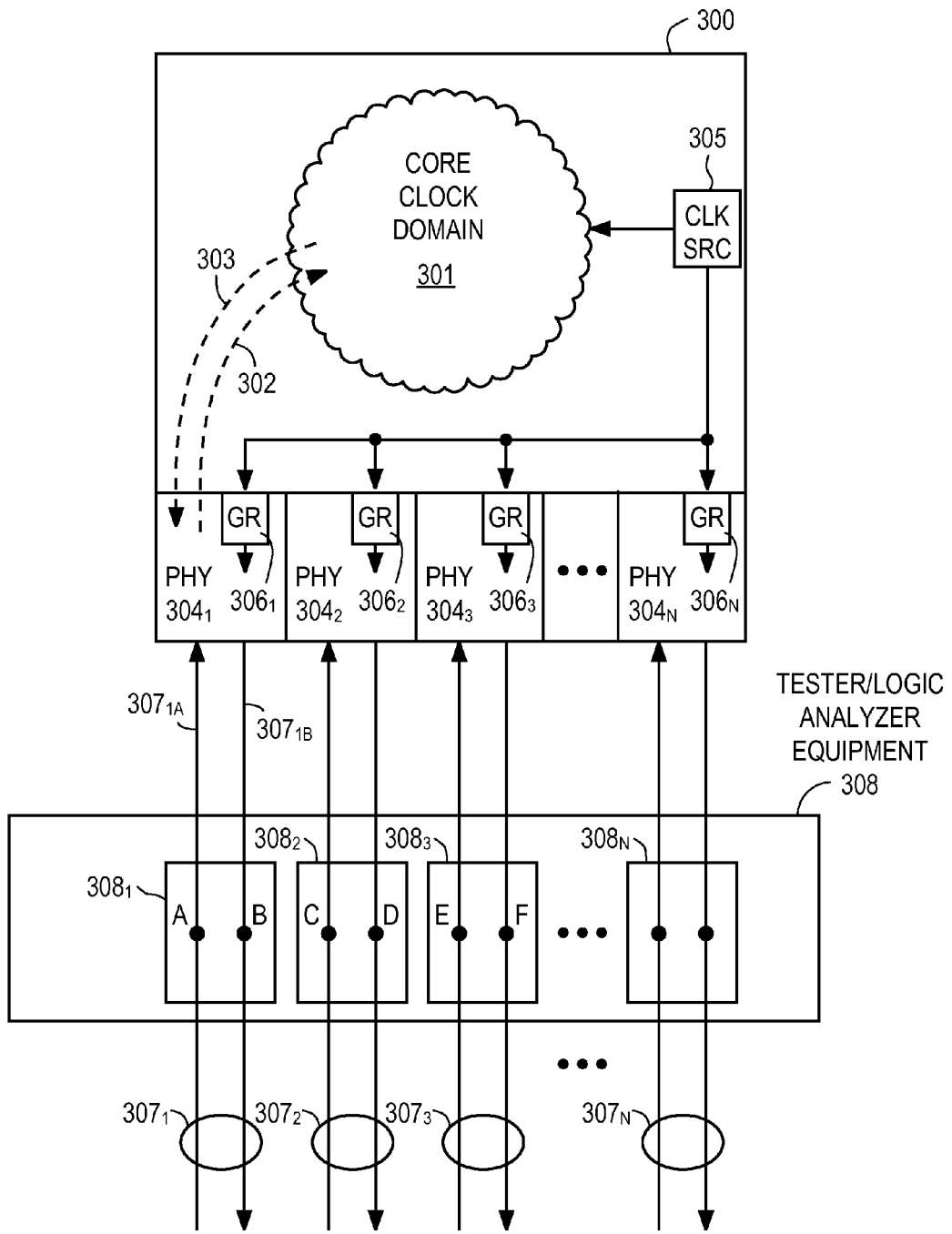
FIG. 3 shows a component within a link based computing system having a core clock domain and physical layer clock domains, with multiple links entering and leaving through independent physical layer blocks.

FIG. 3 shows a component 300 in a link based computing system (e.g., a processing core, a memory controller, an I/O controller, etc.). A plurality of bi-directional links $307_1$ through $307_N$ are shown coupled to the component 300. The bi-directional links may be coupled to other components (not shown in FIG. 3) within the link-based computing system. The component 300 can be viewed as having at least two sub-components: 1) a "core" within a first clock domain 301; and 2) a physical layer comprising sourcepoints/endpoints (e.g., drivers/receivers) for the plurality of bi-directional links 304.

The core can be viewed as the component's primary functionality (e.g., the circuitry used to perform processing if the component is a processing core; the circuitry used to perform memory controller functions if the component is a memory controller, etc.). The core clock domain 301 is largely another way of defining the core because it encompasses the collection of core circuitry whose timing is determined from a clock source 305. Transfers within the core clock domain are considered to be fully synchronous within that domain. The physical layer 304 is the circuitry used to prepare data for and transmit data over the outbound links. The physical layer 304 also includes the circuitry used to receive data from the inbound links and prepare the received data for presentation to the core clock domain 301.

Each region of circuitry used for preparing data for transmission over a particular outbound link and for preparing data for presentation to the core 301 after reception from a particular inbound link can be viewed as a separate, independent region of the physical layer 304. FIG. 3 shows N such regions $304_1$ through $304_N$. Note that, although each physical layer region has clocking derived from the same clock source 305 from which the core 301 is clocked, there can be different "gear ratios" $306_1$ through $306_N$ for clocking packets into the physical layer, as well as different propagation delays between the core and the individual physical layer synchronous domains and the signals observable external to the component A gear ratio for a particular physical layer region is the difference (expressed as a multiplication factor) between the frequency of the core's reference clock source 305 and the frequency of the clock that is used by the physical layer region. For example, if the core clock reference source 305 frequency is 4.0 GHz and the gear ratio $306_1$ for physical layer region $304_1$ is 2:1; then, physical layer region 304 will have its circuitry clocked with a 2.0 GHz clock frequency. Note that the core clock reference source 305 may include its own frequency multiplication of an oscillator source (e.g., a phase lock loop circuit that multiplies a crystal oscillator frequency). Moreover, it is possible to design the component 300 such that there exists a factored clock frequency change between the source 305 and any of gear ratios 306. Such factored changes may also be associated with a physical layer region's gear ratio.

Figure 1A:
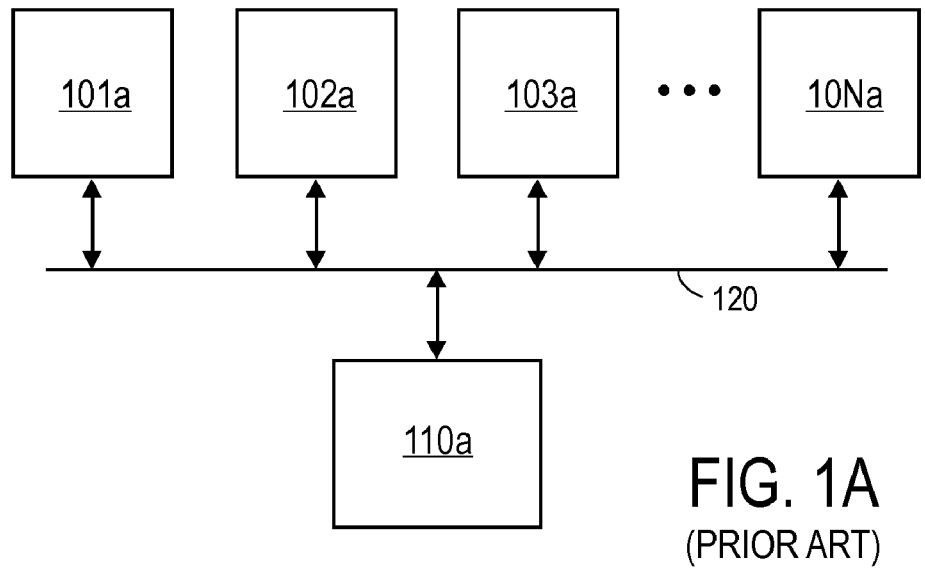
FIG. 1a shows components interconnected through a multi-drop bus.
Figure 1B:
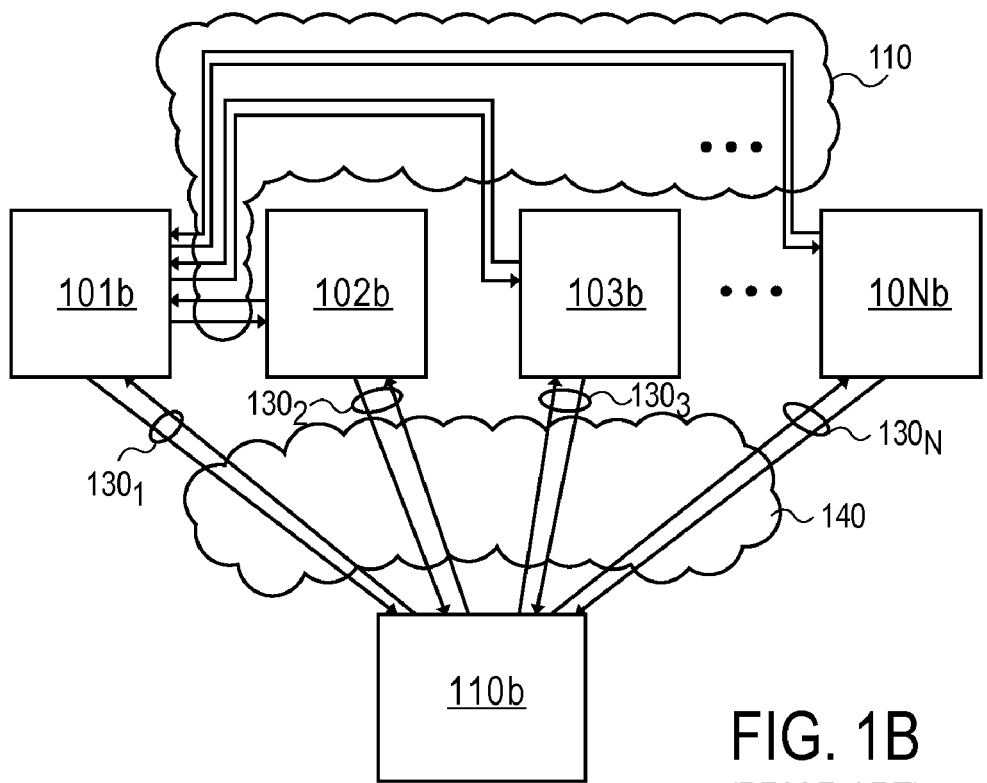
FIG. 1b shows components interconnected through a mesh of point-to-point links.
Figure 2:
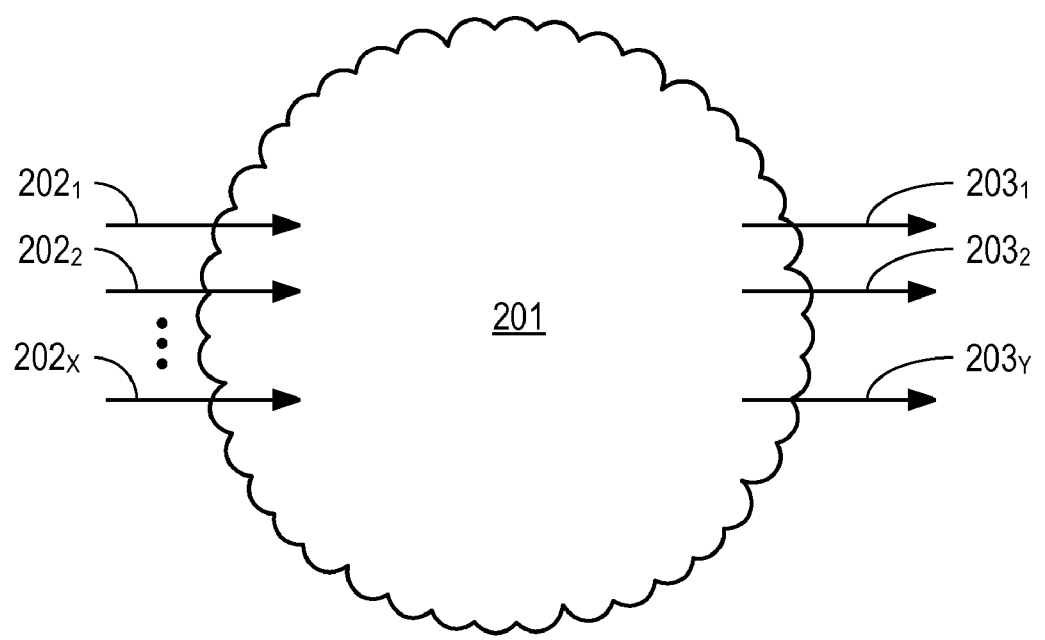
FIG. 2 shows a representation of a system component (either a single device or associated set of devices) implementing circuitry having multiple links for inputs and outputs.

Recalling from the discussion of FIG. 2 that it is important to know both the substantive and temporal component of inputs/outputs provided to/from a region of circuitry to be analyzed (such as the core 301), the presence of gear ratios $306_1$ through $306_N$ (for all cases of non-1:1 gear ratios, such as 3:2, 5:3, 4:5, etc) and propagation delays across the core, physical, and I/O boundaries pose difficulties if the time at which inputs presented to the core 301 from the physical layer 304 are to be known based upon measurements/traces taken at a point along an inbound link. For example, the presence of a non-1:1 gear ratios $306_1$ can negatively impact the testing precision (by introducing timing ambiguity) as to when an input packet 302 was presented to the core 301 if the time of presentation is based upon the time at which the packet was observed (traced) passing point A on inbound link $307_{1A}$ (i.e., the time of presentation of the input packet 302 to the core 301 is based upon a measurement taken before the actual presentation of the input packet 302 to the core 301).

Likewise, the presence of gear ratios $306_1$ through $306_N$ (particularly in the case of non-1:1 gear ratios such as 3:2) and propagation delays across the core, physical, and I/O boundaries can pose difficulties if the time at which outputs presented from the core 301 to the physical layer 304 are to be known based upon a measurement taken at a point along an outbound link. For example, the presence of a non 1:1 gear ratio $306_1$ can negatively impact the testing precision as to when an output packet 303 was presented from the core 301 if the time of presentation is based upon the time at which the packet was observed passing point B on outbound link $307_{1B}$ (i.e., the time of presentation of the output packet 303 from the core 301 is based upon measurements/traces taken after the actual presentation of the output packet 303 from the core 301). A discussion of non-1:1 gear ratios is provided in more detail further below with respect to FIG. 5.

A simple solution to avoid the difficulties alluded to above is to timestamp each outbound packet and to report the timestamp of each inbound packet. For inbound packets a timestamp is the time or some other indication of the core clock cycle at which an inbound packet is presented to the core 301; and, for outbound packets, a timestamp is the time or some other indication of the core clock cycle at which an outbound packet is presented from the core 301. If outbound packet 303 were time stamped, a measurement made at point B of outbound link $307_{1B}$ would have little if any imprecision because the time at which the packet was presented from core 301 to physical layer region $304_1$ would be carried as an additional data structure by the packet itself. Thus, in order to understand the time of presentation from core 301 for testing purposes, all that would need to be done is to sample this data structure from the packet at point B of link $307_{1B}$.

Likewise, in the case of inbound packets, a timestamp of arrival to the core 301 could be reported for each inbound packet. For example, if outbound packets issued along link $307_{1B}$ where specially adapted to carry the timestamp of core arrival for inbound packets from inbound link $307_{1A}$, conceivably, the time of presentation to the core 301 of packets arriving from inbound link $307_{1A}$ could be determined by sampling these timestamps at point B of link $307_{1B}$. Unfortunately, the overall performance of a link based computing system degrades as more and more "overhead" information is added to the packets that are carried by the mesh network. That is, the more "overhead" information carried by the packets, a lesser percentage of the network's resources are devoted to carrying information used for the actual computational services provided by the computing system.

As timestamp information clearly corresponds to overhead (because its use is directed to the testing/verification of the link-based computing system rather than its computing services), a higher performing link based computing system should be realized if timestamp information describing the input/output times to/from a component core were not carried by the network for every inbound/outbound packet received/issued by the component core. Moreover, basic testing/verification theory discourages imposing a test environment that is markedly different in information exchanged or timing than the environment that the system under test would experience during actual runtime when timing information would ordinarily not be emitted.

Time stamping all packets during a special "test mode" while not imposing time stamping during a "actual runtime mode" is apt to markedly change the effective behavior of the network between testing and non-testing environments (because of the greater amount of overhead carried by the network during test mode). Therefore, imposition of time stamping for all packets during a special test mode would violate the basic testing/verification requirement of being minimally intrusive—leaving the situation as suggested previously: that the time of arrival/presentation to/from a component core 301 should be accurately determined based upon temporally disparate observations made upon the links themselves. That is, the time of a arrival to the core 301 of a packet received from link $307_{1A}$ should be determined based upon the earlier time that the packet is observed passing point A of link $307_{1A}$; and, the time of a presentation from the core 301 of a packet destined to be transmitted upon link $307_{1B}$ should be determined based upon the later time that the packet is observed passing point B of link $307_{1B}$.

Figure 4A:
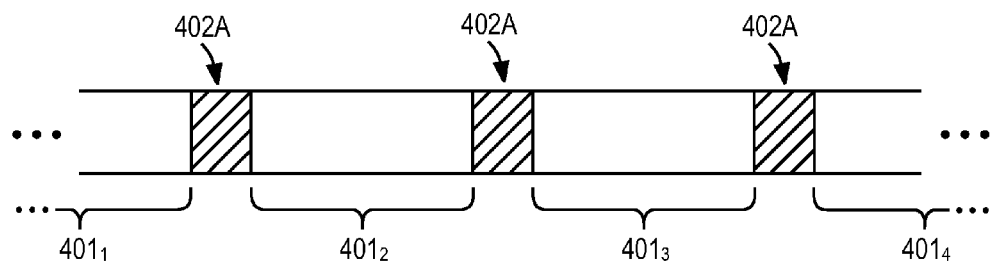
FIG. 4a shows link traffic within a link based computing system.

FIG. 4a shows a high level depiction of an embodiment of the traffic patterns that may be designed into each link of a link based computing system during its normal runtime. According to the depiction of FIG. 4a, the substantive packets used by the computing system to actually execute and perform its computational services (e.g., packets carrying requests for data; packets carrying requests for instructions; packets carrying data; packets carrying instructions; packets requesting a memory read; packets requesting a memory write, etc.) are carried within time spans 401 (i.e., time spans $401_1$, $401_2$, $401_3$, $401_4$, etc.). During occasional time spans 402A, the link is "quiet" (i.e., not being used to carry substantive packets) owing to ebbs in the flows of traffic over the link. Occasional quiet time spans 402A may appear periodically but are more apt to appear non periodically when observed over long periods of time. Note that FIG. 4a is a simplistic drawing in that quite time spans 402 are represented as being periodic and of same expanse. In reality, the length and occurrence of the quite time spans are expected to be significantly more varied than that depicted in FIG. 4a.

Figure 4B:
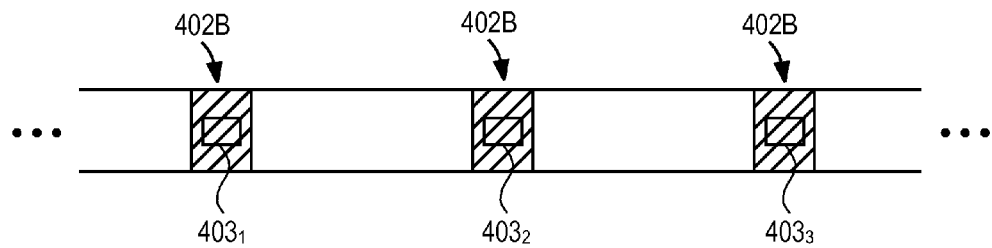
FIG. 4b shows link traffic within a link based computing system that includes substituted time revealing timing packets for use in correlating relative times of multiple traces.

FIG. 4b shows a strategy for opportunistically transmitting (e.g., "sneaking in") timestamp information during the quiet time spans 402B of the link. In particular, the strategy of FIG. 4b indicates that timing packets $403_1$, $403_2$, $403_3$ . . . carrying timestamp information can be carried by the link during its quiet periods 402B. Here, because the link is not being used to carry substantive packets during quite times 402B, the passing of timing packets $403_1$, $403_2$, $403_3$ . . . should not violate, to first order, principles of un-intrusive testing and verification. That is, there should be little or no difference in the passing of substantive packets over the link as between tested and non tested systems.

Given that the occurrence of quiet time spans 402B are apt to be somewhat unpredictable, and, given that high traffic links are apt over moderately long time spans to have relatively narrow/few quiet time spans 402B, the timing packets are not configured to carry a listing of separate timestamps for each and every substantive input/output packet to/from a core that was transported during the link's non quiet time spans (if they were so configured, the size of the timing packets would probably become too large). Instead, as described in more detail below, the timing packets carry temporal calibration information of the timing packet itself from which the arrival/presentation times of preceding and following substantive packets to/from a component core can be calculated.

Better said, upon consideration of the information carried by the timing packets during quiet time, the core arrival/departure times of substantive packets that appeared on the link during non quiet times is determined based upon the moment of their observance on the link during these non quiet times in the stream of packets relative to the timing packets. As described in more detail below, core arrival/presentation times are determined based upon a correlation that is established between the time a packet is observed on a link and the time the packet is presented from/received by a component core. The timing packets carry the information used to establish this correlation.

Figure 5:
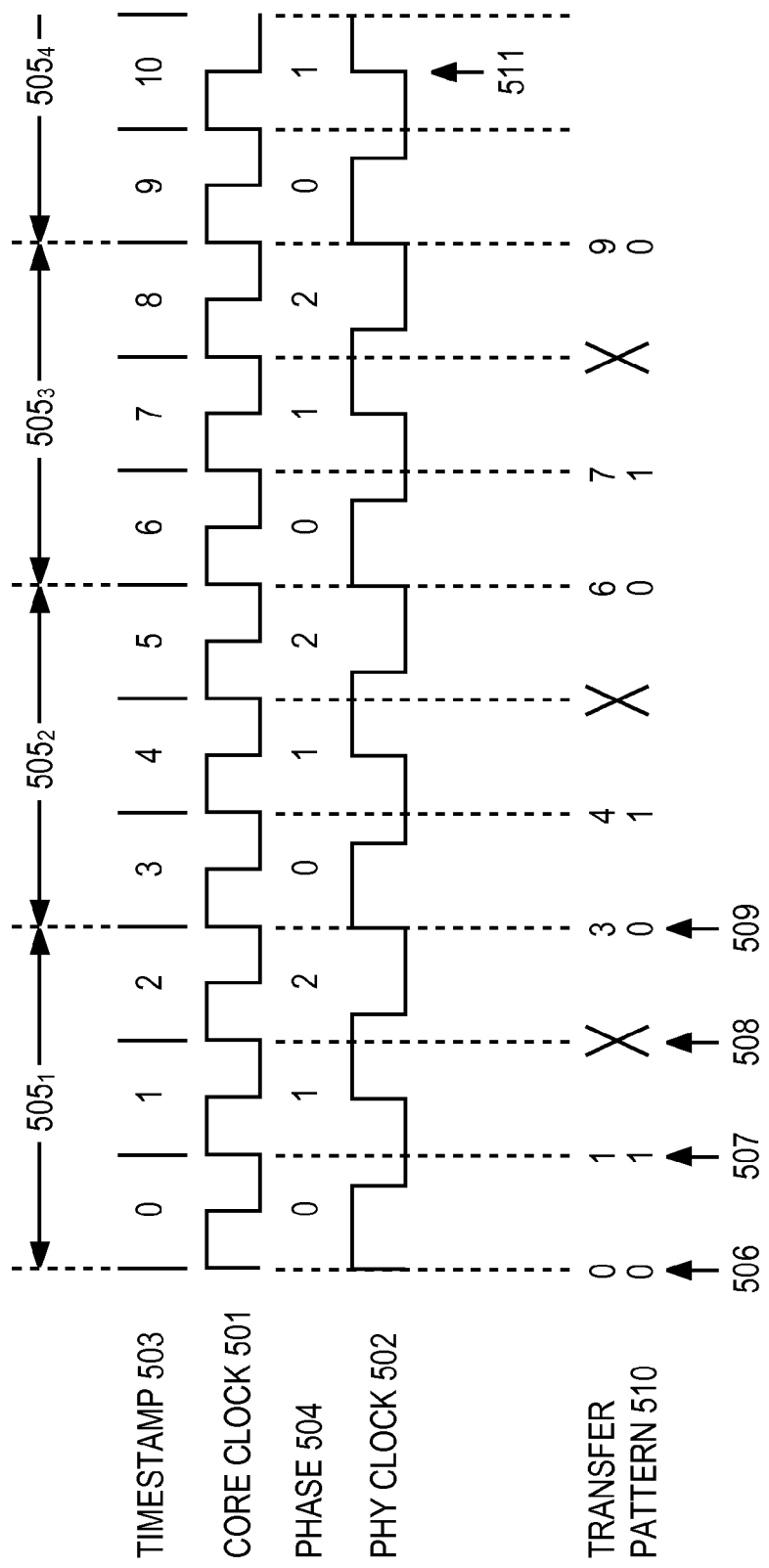
FIG. 5 shows an example of a core clock domain clock and a physical layer domain clock.

FIG. 5 shows an example of how this correlation can be effected. FIG. 5 shows a core clock 501 having three clock cycles for every two physical layer clock 502 cycles (i.e., a gear ratio of 3:2) for the link whose packets are being observed. Referring to both FIGS. 3 and 5, if outbound packets from physical layer region $304_1$ are being observed at point B on link $307_{1B}$, core clock 501 corresponds to the clock from clock source 305 and physical layer clock 502 corresponds to the clock of physical layer region $304_1$ that results from gear ratio $306_1$.

For the correlation of outgoing packets on link $307_{1B}$ measured at point B (i.e., in order to determine the time at which packets are presented from core 301 to physical layer region $304_1$), in an embodiment, a timing packet sent along link $307_{1B}$ contains: 1) a transmit timestamp 503 that defines the core clock cycle at which the timing packet was first made available from the core 301 for transfer to the physical layer region $304_1$; and, 2) another indication 504 (referred to as the "transmit transfer phase" (or simply "phase")) that defines a specific time period within which the timing packet was actually transferred from the core 301 to the physical layer region $304_1$. As described in more detail below, the particular embodiment of FIG. 5 shows each specific time period of the phase indication 504 being articulated as a specific core clock cycle that transpires within a group of physical layer clock cycles that are themselves coextensive in time with a group of core clock cycles as dictated by the applicable gear ratio.

FIG. 5 shows exemplary timestamp values 503 and corresponding phase values 504. A core clock timestamp is simply a number that increments with each core clock cycle. Thus, the core clock timestamp values 503 of FIG. 5 increment with each cycle of the core clock 501. The transmit phase 504 identifies, as described just above, a particular core clock cycle within a group of core clock 501 cycles that are coextensive with a group of physical layer clock cycles 502 as a consequence of the applicable gear ratio. The particular core clock cycle identified by the transmit phase is the core clock cycle within its group of clock cycles at which the transmit packet actually transferred into the physical layer clock domain. For the 3:2 gear ratio of FIG. 5, groups of three core clock cycles are shown to be coextensive with groups of two physical layer clock cycles. Individual regions $505_1$, $505_2$, $505_3$ and $505_4$ identify these coextensive group pairings. Therefore only three phase values are possible and the phase can be represented within a modulo of 3 (i.e., 0, 1 or 2). The possible phase values 504 for each group of 3 core clock 501 cycles and 2 physical layer clock 502 cycles are observed in FIG. 5.

Here, assume that the clocking rules for an actual transfer into the physical layer clock domain are as follows: an actual transfer into the physical layer clock domain will occur if a timing packet is made available for transfer on a core clock rising edge and: 1) if the physical layer clock is aligned with the aforementioned rising core clock edge, then, the transfer will be on the rising edge of the physical layer clock edge; or, 2), if not 1), the transfer will be on the next rising physical layer clock edge after the aforementioned rising core clock edge. Accordingly then, referring to FIG. 5, transfers into the physical layer can only occur in the first two core clock cycles of any group (i.e., transfers are only possible at phase values of 0 and 1) because the last core clock cycle within a group (e.g., timestamps 2, 5, 8, etc.) do not exhibit conditions under which a transfer may occur. This is simply an artifact of the underlying 3:2 gear ratio. Note that this description applies for one of many implementation approaches for accomplishing transfer between two clock domains, but deterministic transfers shall always result in regular, encode-able core clock and physical phase sequences.

Thus, if a timing packet is made available by the core 301 for transfer to the physical layer region $304_1$ at moment 506; then, the timing packet would contain a timestamp value of 0 and a phase value of 0 (i.e., the mechanism from "1)" above is performed). Also, if a timing packet is made available by the core 301 for transfer to physical layer region $304_1$ at moment 507; then, the timing packet would contain a timestamp value of 1 and a phase value of 1 (i.e., the mechanism from "2)" above is performed).

At time 508, there must be a "skip" in which no packet is transferred because of the 3:2 gear ratio. The mechanisms described above would continue into groups $505_2$, $505_3$ and $505_4$ (i.e., a transfer shall occur at time 509 having timestamp=3 and phase=0; then, a transfer shall occur on the next core clock cycle having timestamp=4 and phase=1; then, a skip; then, a transfer shall occur that corresponds to timestamp=6 and phase=1, etc.). Note that a pattern emerges amongst the timestamp and phase information. That is, timestamps have a skip at 2, 5, 8, 11 etc; and, the phase information toggles between 0 and 1. This pattern is referred to as the transfer pattern 510 and is depicted in FIG. 5.

Importantly, with knowledge of the 3:2 gear ratio the transmit phase modulo of 3 and the transfer clocking rules defined above, the waveforms 501, 502 of FIG. 5 can be "reconstructed" through simple observation of the transfer pattern alone along a link upon which the physical layer $306_1$ transmits. That is, since the physical layer clock 502 can be extracted by a device that is on the receiving end of a link that the physical layer transmits upon (e.g., referring to FIG. 3, the physical layer clock of physical layer $306_1$ can be determined by logic analyzer $308_1$ because of its reception at point B (e.g., by receiving the serial data through a phase-lock-loop circuit that essentially frequency locks to the physical layer clock)), the physical layer clock 502 is a "known" with respect to the problem of trying to determine precisely which core clock cycle a packet was made available for transfer to the physical layer.

The transfer pattern 510 serves as information that can be used to "work backwards" from: 1) the physical layer clock cycle of arrival for a packet at a link observance point (e.g., point B in FIG. 3); to, 2) the core clock cycle (relative to the core clock counter) at which the packet was made available for transfer. Thus, accessibility to the physical layer clock and observation of the transfer pattern (in light of knowledge of the applicable gear ratio, corresponding transmit phase modulo and clocking rules) serve as the underlying features that permit the aforementioned correlation between the moment of link observance and the moment of core emission.

The tester/logic analyzer equipment 308 can be simply told (e.g., programmed) as to the applicable gear ratio, transfer pattern, phase modulo and clocking rules in order to effect the correlation. Different gear ratios, clocking rules than those defined above (e.g., negative edge vs. positive edge), and/or different temporal relationships as between the core clock and physical layer clock (e.g., the physical layer clock edges move to the left or right in FIG. 5) can yield different transfer patterns than those observed in FIG. 5. From a priori knowledge of any of these transfer patterns, the appropriate waveforms can be determined and the core clock cycle in which a packet was made available for transfer can still be determined.

Once one or more timing packets have been received along a link observation point and the received timestamp and phase information values have been examined to derive which core clock cycles are skipped, the packet correlation algorithm is said to be in "synchronization" with the transfer pattern. Once synchronization with the transfer pattern has been achieved, as long as the physical layer clock cycle at which any packet—including non timing packets such as substantive packets carried within time span 401 of FIG. 4b—was observed to arrive on the link is known (e.g., by tracking the physical layer clock cycle of arrival for each packet), the core clock cycle at which each and every packet was made available from the core for transfer to the physical layer can be determined. This is true for all packets that were observed on the link prior to and after synchronization points with the transfer pattern at each observed timing packet.

The specific core clock cycle of availability for each packet is determined as a number of core clock cycles from the issuance of a timing packet (or from an earlier subsequent packet) and is therefore referred to as a "local device core clock counter relative time". That is, the specific core clock cycle for the subsequent packet is defined relative to the core clock cycle of availability for a timing packet, which carries its specific core clock timing and phase in the continuous packet sequence. Since this same mechanism and trace processing can be accomplished for packets on multiple links originating from each device, and since all links in a device are required to utilize the same timestamp counter, the relative timing of packets traced coming from transmissions on all of these links can be correlated relative to each other in the core clock domain of each device.

To understand how the core clock availability cycle for any packet can be determined from the timestamp and phase information contained in a single timing packet, consider the situation of FIG. 5 where the timing packet is received at point B of FIG. 3 with a timestamp value of 0 and a phase value of 0. If a timing packet arrives with timestamp value of 0 and a phase value of 0, a logic analyzer that samples at point B can establish a correlated time of the crossing from core to physical domains of that packet internal to component 300. Specifically, that the timing packet was emitted at moment 506 of FIG. 5. Therefore, simply by counting physical layer clock cycles at point B of link $307_{1B}$ after the arrival of the timing packet and with knowledge of the applicable gear ratio and its resulting transfer patterns, the arrival of any subsequent packet at point B can be correlated back to a core clock cycle at which the subsequent packet was made available to the physical layer 304 from the core 301.

That is, for example, if a subsequent packet arrives within physical layer clock cycle 511 (i.e., 7 physical layer clock cycles after the arrival of the timing packet having core clock timestamp=0 and phase=0); then, taken directly from the clock patterns of FIG. 5, the subsequent packet must have been made available from the core at the core clock cycle that corresponds to timestamp value 10. Note that in other implementations there may be some predetermined number of N core clock edges between the core clock edge upon which a packet issues from the core and the physical layer edge upon which a packet is transmitted.

If so, the specific core clock edge can still be easily determined by counting backward the appropriate number of core clock edges. Similarly, for this mechanism to operate successfully, transfers between core and physical layer must be deterministic, including any queuing in the data path between the core and physical layers (e.g., a packet emission from the core is from a transmit queue; and, a packet input to the core is placed into a receive queue, with transfer to/from the queues in the core domain strictly following the transfer phase pattern).

Note that the propagation delay between the physical layer clock within the transmitting device physical layer $306_1$ and the physical layer clock after monitoring tool data recovery at point B is immaterial provided the propagation delay of the packets themselves is controlled to be constant from the time of their transfer into the physical layer region $304_1$ to the time that they are observed at point B. In an embodiment, any drift in this propagation delay through individual elements of the full path is tracked (through the observance of periodic retraining timing packets) and compensated for so as to preserve the constant propagation delay condition. In a further embodiment, this delay is tracked and actively compensated for over time through the use of a drift buffer. In using a drift buffer, at link initialization packets observed at the observation point (point B) are originally placed into the middle of a drift buffer, with packets removed a half buffer length later from the buffer.

Following link initialization, if the tracked propagation delay falls, packets are placed into the buffer behind the buffer midpoint to effectively increase their propagation delay through the buffer (so as to keep their total propagation delay constant). If the tracked propagation delay increases, packets are placed into the buffer forward of the buffer midpoint to effectively decrease their delay through the buffer (again, so as to keep their total propagation delay constant). Establishing and maintaining relative positions of packet loading into and removal from the buffer can be accomplished by any of several implementations that shall be apparent to those of ordinary skill. If too much actual phase drift occurs between the core clock and the physical layer clock, the transfer pattern will change (e.g., the 2, 5, 8 pattern of skipped timestamp values will be broken) which effectively corresponds to loss of transfer pattern synchronization. In this case all that needs to be done is another initialization process of reception and analysis of timing packet(s) in order to regain synchronization to the new transfer pattern.

During each link initialization, and synchronization of the timing pattern the relationship between the core clock and the physical clock phase may vary in the transmitting device, causing transfer and "skip" transfers from core to physical layer to vary, although the pattern of transfers and skips will always be the same, just "rotated" by some random phase. Deviation after initialization from an observed relative timing/phase synchronization (as detected by seeing timing packets falling into clocks which should be "skips") without going through another link initialization is an indication that synch has been lost (e.g., through too much propagation delay drift) and that the observed packets relative timing correlation needs to be re-established.

As discussed above, the correlation technique can also be used to identify the core clock cycle of availability for packets that were observed at point B prior to the observance of a timing packet (assuming the physical clock cycle of each "previous packet" was recorded). Moreover, the correlation technique discussed above can be used to identify the core clock cycle times availability for packets in situations where the core clock frequency is less than the physical layer clock frequency. Of course, the correlation technique discussed above can be used for gear ratios other than 3:2. Conceivably, as an alternative approach, timestamp and transfer phase values could be assigned in the physical layer clock domain, particularly if the core to physical layer gear ratio is of the nature of 1:N.

Figure 6:
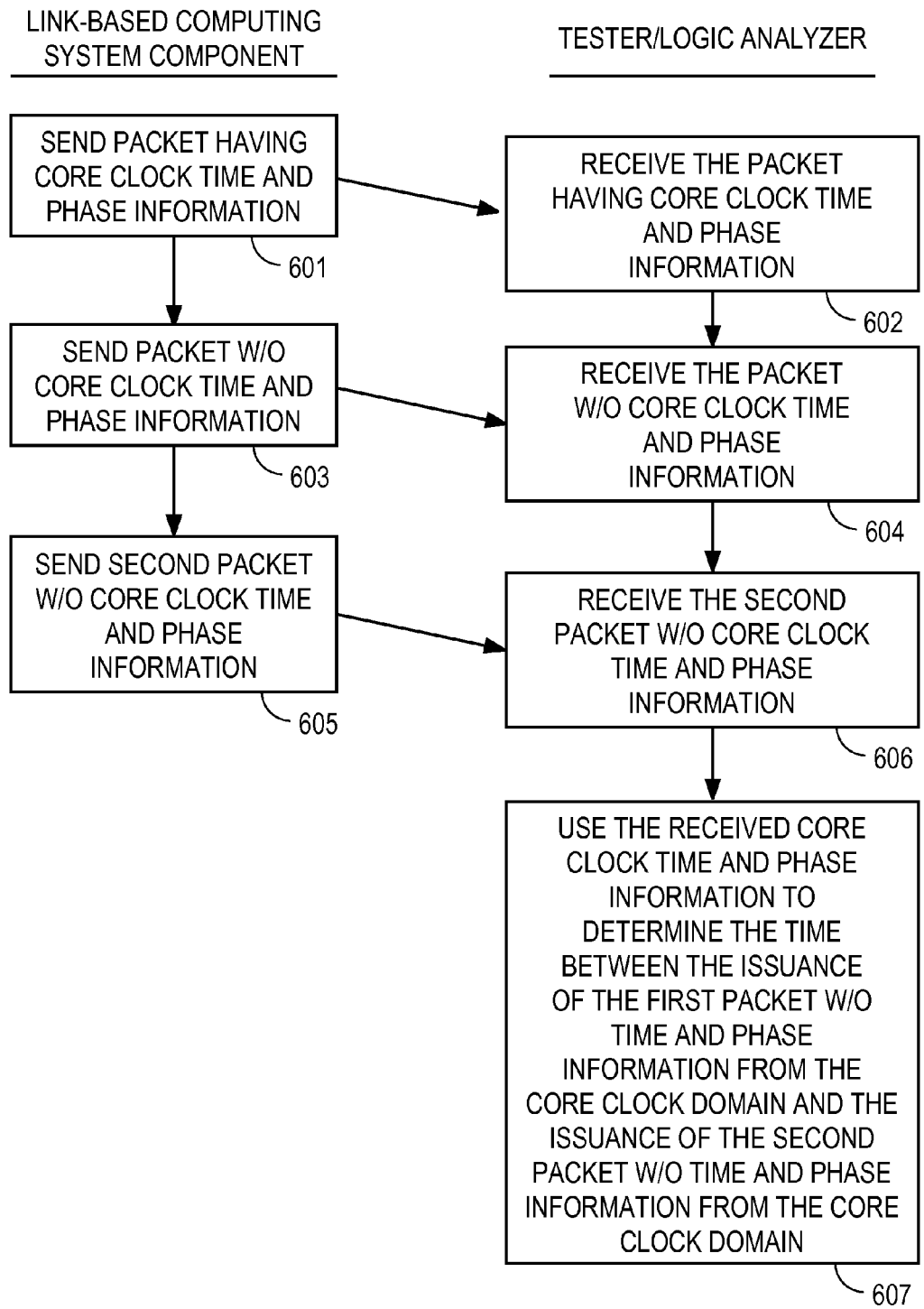
FIG. 6 shows a method for determining relative times of arrival/departure of core input/output packets within a link-based computing system.

So far, the ability to determine a core clock time of issuance of a packet from a core based upon a later observance of the packet on a link after it has been transmitted has been discussed. The ability to determine the core clock time of presentation to the core based upon an earlier observance of the packet on a link as it heads toward the core will be discussed in more detail ahead with respect to FIG. 7. Meanwhile, FIG. 6 shows an embodiment of a high level methodology in flow chart form for determining core clock time of issuance/presentation to/from a core. Because the methodology of FIG. 6 applies at least to the determination of packet availability core clock times based upon later observances of the packets on the link, as discussed in detail above with respect to FIG. 5, FIG. 6 is discussed presently.

According to the methodology of FIG. 6, a timing packet having core clock timestamp and phase information is transmitted 601 from a component with a link based computing system. In an embodiment, the timing packet is sent during link "quiet time" when the core is not sending any substantive information used by the computing system to perform its computing services. The timing packet is later received 602 by a tester or logic analyzer that is coupled to the link upon which the timing packet was transmitted. The tester/logic analyzer uses the timing packet, in conjunction with the physical layer clock (which the tester/logic analyzer has access to), to gain synchronization to the transfer pattern. The component then later sends 603 a substantive packet that does not contain any timestamp or phase information.

The tester/logic analyzer receives 604 this packet on the link. If it desires to, the tester/logic analyzer could determine the relative component core clock time at which this packet was made available to the physical layer by counting physical layer clock cycles between the arrival of the timing packet and the arrival of the substantive packet. The component then transmits 605, at a later time, a second substantive packet having no timestamp or phase information. This packet is also received 606 by the tester/logic analyzer. After, the arrival of the second substantive packet, the tester/logic analyzer is able to determine how many core clock cycles existed between the issuance of the first substantive packet from the core and the second substantive packet from the core 607. This information is important for testing/verification of the core because it shows the output timing of the core.

Figure 7:
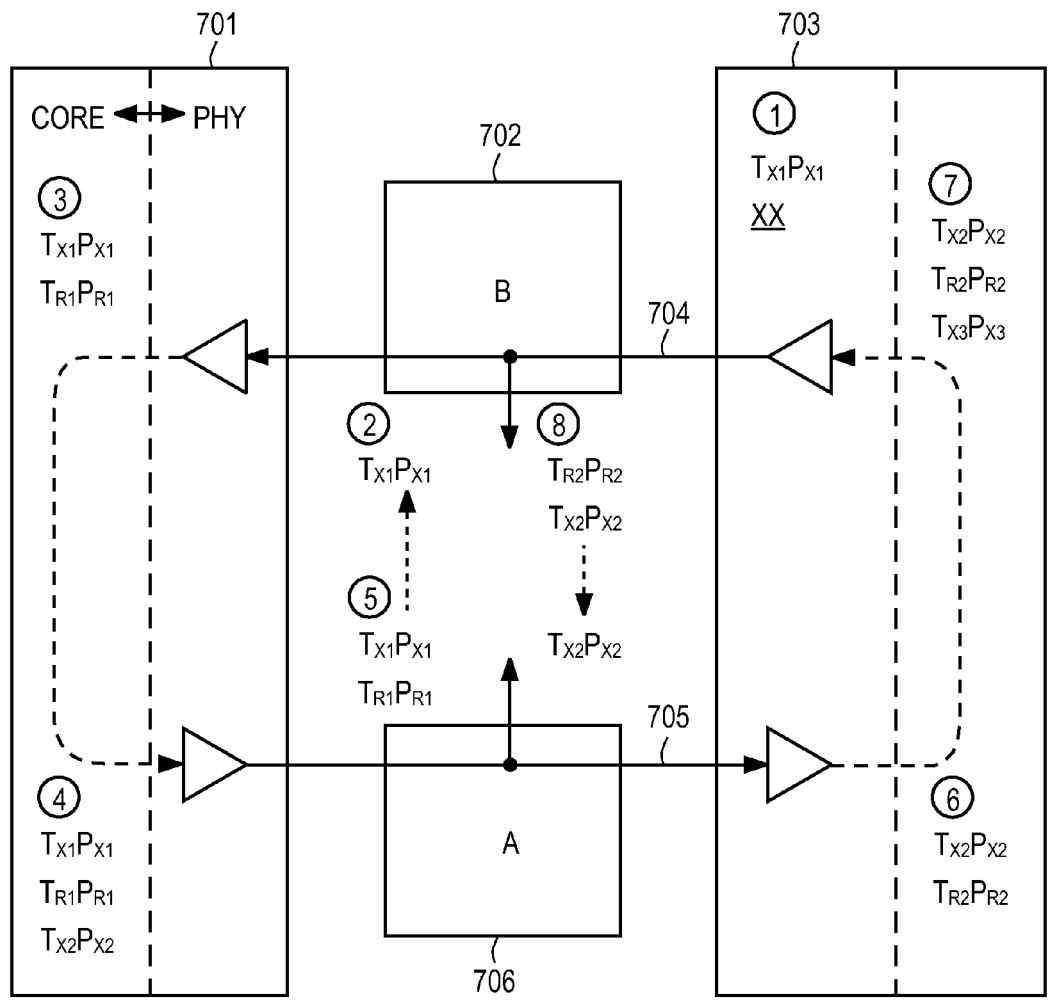
FIG. 7 shows a depiction of a bi-directional link within a link based computing system

FIG. 7 demonstrates the ability to determine the core clock time of presentation of received packets to a core based upon an earlier observance of the packet on a link as they head toward the core. In particular, the immediately following discussion will demonstrate how the time of presentation of packets to the core of component 701 can be determined for a sequence of packets that is sent from component 703 to component 701 along link 704 and is observed at point B of link 704 by a tester/logic analyzer 702. According to the correlation scheme described herein, during a quiet time of link 704, a (703 to 701) timing packet having the timestamp and phase information ($T_{X1}, P_{X1}$) that describes its transfer from the core of component 703 is sent 1 from component 703 to component 701 along link 704.

The (703 to 701) timing packet is observed 2 at point B of link 704 by tester/logic analyzer 702. The timestamp and phase information ($T_{X1}, P_{X1}$) of the timing packet can be used by the tester/logic analyzer 702, as described above with respect to FIG. 5, to determine the core clock cycle of availability for each of plurality of prior and following packets transferred from the core of component 703. The timestamp and phase information ($T_{X1}, P_{X1}$) of the timing packet is also used, as described in more detail below, as an identifier for the (703 to 701) timing packet in determining its arrival time at the core of receiving component 701. After the timing packet is received by the physical layer of component 701 and precisely at the time the packet is presented 3 to the core of component 701, the corresponding core clock timestamp and transfer phase ($T_{R1}, P_{R1}$) of the (703 to 701) timing packet's presentation to the core of component 701 is recorded (e.g., by storing the information in registers in the receiving component).

The receive timestamp and phase information for identifying the core clock cycle at which a timing packet was transferred to the core from the physical layer may be determined, at least in one embodiment, in accordance with the reverse of the principles that have been discussed above in FIG. 5. For example, a timestamp may be used to identify the core clock cycle at which the received packet was actually transferred from the physical layer to the core; and, phase information may be used to identify the core clock cycle (within the repeating receive transfer pattern) at which the packet was first made available for transfer from the physical layer to the core.

Because the received ($T_{X1}, P_{X1}$) information is used as an identifier for the timing packet itself, the total information that is tracked in component 701 for the (703 to 701) timing packet is (($T_{X1}, P_{X1}$),($T_{R1}, P_{R1}$)).

During a subsequent quiet time of link 705, a (701 to 703) timing packet is sent 4 from component 701 along link 705 having the previously described transmit timestamp and phase information ($T_{X2}, P_{X2}$) identifying its time of issuance from the core of component 701. The ($T_{X2}, P_{X2}$) timestamp and phase information can be used by the tester/logic analyzer to determine the core clock time of availability from the core for the timing packet within component 701 as described above with respect to FIG. 5.

The (701 to 703) timing packet sent along link 705 also is composed to include the (($T_{X1}, P_{X1}$),($T_{R1}, P_{R1}$)) information that is being tracked by component 701 for the most recent (703 to 701) timing packet that was sent along link 704. When the (701 to 703) timing packet containing the ($T_{X2}, P_{X2}$) and the (($T_{X1}, P_{X1}$),($T_{R1}, P_{R1}$)) information is observed 5 at point A of link 705 by the tester/logic analyzer 706, the ($T_{R1}, P_{R1}$) information is understood to identify the time and phase of arrival to the core of component 701 of the (703 to 701) timing packet identified by the ($T_{X1}, P_{X1}$) information (i.e., the aforementioned timing packet sent along link 704).

The ($T_{R1}, P_{R1}$) information can be used to establish a correlation, according to the techniques described above with respect to FIG. 5, between the time of observance of prior and subsequent packets at point B on link 704 and their core arrival times to the core of component 701. Note that in an embodiment where link transmitters are physical layer clock masters and link receivers are physical layer clock slaves, different clock domains are associated with tester/analyzer 702 and tester/analyzer 706.

In order to properly measure the arrival of packet traffic from link 704 into the core of component 701, the time of observance of a packet (either timing or substantive) at point B of link 704 should be correlated to or otherwise marked in reference to the physical layer clock of link 705 rather than link 704. That is, appropriate measurements of the timing of traffic into component 701 should be measured in reference to the clock of link 705 because the physical layer clock of link 705 and not link 704 will be derived from the core clock of component 701.

After the (701 to 703) packet having the ($T_{X2}, P_{X2}$) information and the (($T_{X1}, P_{X1}$),($T_{R1}, P_{R1}$)) information arrives at component 703, the timestamp and phase information for its presentation ($T_{R2}, P_{R2}$) to the core of component 703 is likewise recorded. This recorded timing/phase information, along with the ($T_{X2}$,$P_{X2}$) "identifier" for the (701 to 703) timing packet, may be attached to another subsequent (703 to 701) timing packet sent along link 704 that also includes the timestamp and phase information (e.g., "($T_{X3}$,$P_{X3}$)") of the timing packet's own issuance from the core of component 703. The ($T_{R2}$, $P_{R2}$) information, after being observed at point B of link 704 by tester/analyzer 702, can then be used to establish a correlation between the observance of packets traced at point A by tester/analyzer 706 and their time of arrival to the core of component 701.

The essential value of this invention is that the correlation schemes discussed above (both determination of core arrival times based upon an earlier observance of an inbound packet and determination of core departure times based upon a later observance of an outbound packet) can be applied not only to a single bi-directional link that flows to/from a single component but also to multiple bi-directional links that each flow to/from the same component. For example, referring back to FIG. 3, if the correlation schemes referred to above were applied to each of bi-directional links $307_1$ through $307_N$; then, the it is possible to precisely correlate, relative to the core 301, the entire set of inputs to the core 301 from all links and the entire set of outputs from the core 301 to all of the links, as result of post processing (as described above) traces captured on each of the links $307_{1A,1B}$ thru $307_{NA,NB}$ by the tester/logic analyzer 308.

This is straightforward because all correlations trace back to the same core clock domain 301 and source 305. Note that for this mechanism to work, the timestamp values must be consistent across the different physical layers that exist within a single component. That is, for example, different packets made available for transfer on the same core clock cycle to different physical layers must be labeled with the same timestamp value (or with a precisely known offset between the values that can be compensated for during post processing of the traces).

Figure 8:
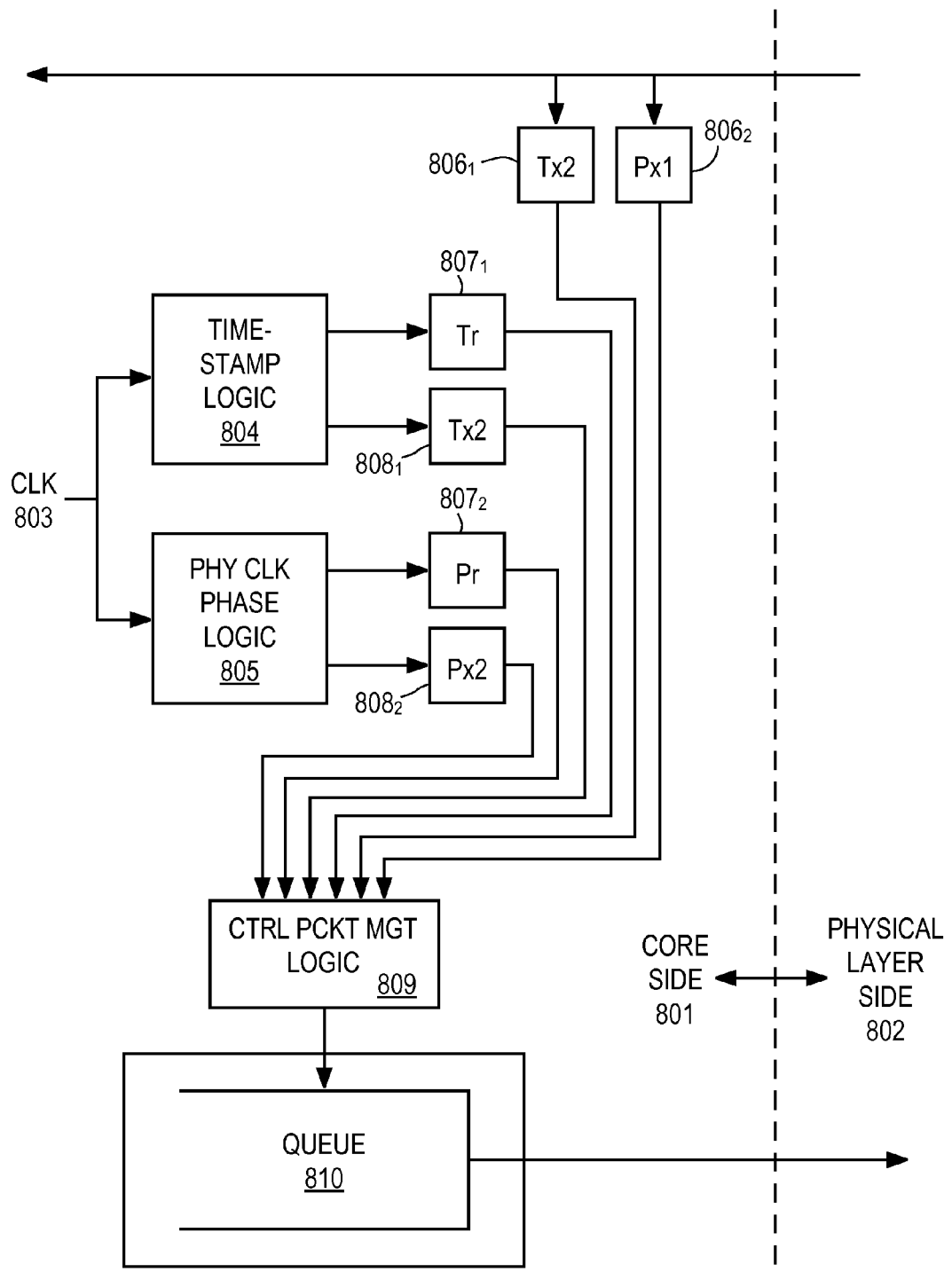
FIG. 8 shows an embodiment of circuitry that could be instantiated into a core of a component within a link-based computing system.

FIG. 8 shows a block diagram of an embodiment of the circuitry that could be instantiated into a component of a link based computing system in order to support the correlation schemes discussed herein. Recall from the discussion of FIG. 7 that each component construct timing packets during link quiet time that include: 1) an identifier of the most recent previously received timing packet, created using that previous timing packet's received timestamp and phase information (describing its issuance from the core of the component that sent it); 2) the previously received timing packet's point in time timestamp and phase information that describes its reception by this core; 3) the constructed timing packet's timestamp and phase information that describes its issuance from this core that constructs it. FIG. 8 shows an embodiment of circuitry designed into the core that could be designed to construct timing packets as described just above.

Referring to FIG. 8, the circuitry includes multiple registers 806, 807, 808 that contain the various information that is to be packed into a timing packet. Here, a received timing packet is received by the core 801 from the physical layer 802; and, the received timing packet's carried timestamp and phase information describing its issuance from the core of the component that sent it is stored into registers $806_1$ and $806_2$ respectively. The timestamp and phase information that describes the timing of the reception of the received packet by the core is stored in registers $807_1$ and $807_2$, respectively. Here, timestamp logic circuitry 804 (which, in an embodiment, includes a counter that increments with each core clock source 803 clock cycle) determines the timestamp of reception.

Also, physical layer clock phase logic circuitry 805 encodes transfer phases of the physical layer clock relative to the core clock. In an embodiment circuitry 805 also includes a counter having a modulo that is equal to the number of phases of the core clock for a repetition of the transfer pattern of packets to and from the physical layer clock domain, independently for transmitted and received directions. The circuitry 805 may also include an input that receives the physical layer clock from the physical layer 802; or, include a gear ratio transfer predictor that is identical to the physical layer's so that the encoded phase values can be generated on the core side 801. Circuitry 804 and 805 also sources the timestamp and phase information that describes the time of issuance from the timing packet under construction. This information is recorded continuously (at each core clock) in register space $808_1$, $808_2$, respectively (i.e., a second part of register space 807 and a second part of register space 808) so that it is at all times current in case there is an opportunity to transmit a timing packet on the link.

Here, timing packet management logic circuitry 809 is responsible for: 1) sensing the state of a queue 810 that feeds the physical layer 801 to recognize when the link is quiet (e.g., if the queue is empty then there are no other normal traffic packets waiting to be transmitted on the link); and, 2) reading the information from the registers 806, 807, 808 to construct the timing packet. In an alternate embodiment, the time stamp logic 804 output and core to physical layer transfer phase logic 805 output do not flow into a register when the time of issuance information for the packet being constructed so that it can entered into the packet directly without wasted clock cycles that arise from temporary storage into registers. The timing packet may be placed into the queue by the management logic 809 to secure the timing packet' passing into the physical layer. Logic circuitry 804, 805, 809 may be designed with various logic circuitry implementations such as hardwired logic gates and/or programmable circuitry, as long as it conserves the property of deterministic recording of transmission time and phase relative to the packet being transferred to the physical layer.

In order to construct the tester/logic analyzer of FIG. 3, each link may be intercepted with a power splitter or a repeater having at least two outputs. A first output is coupled to a driver that re-drives the link's traffic to its destination. A second output is used as the input to the circuitry of the tester/analyzer that processes and stores a trace of live data received off of the intercepted link. The timestamp and phase information is embedded in packets appearing in the link traffic which is passed along to the portion of the tester/logic analyzer that captures traces in real time. After traces of all links have been captured, the traces are passed to a facility with capability to post processes this the link traces, including embedded relative timing packet information in order to perform the correlations described in detail above.

Referring back to FIG. 3, note that the tester/logic analyzer equipment 308 used for capturing and determining the timing of the input/output packets to/from core 301 ordinarily includes multiple analyzers $308_1$ through $308_N$ each having its associated time domain. Each of these may be communicative coupled to each other and/or to a separate computing system. This circuitry used to perform the capture of traces with embedded timing packets to enable correlation post processing may include hardwired and/or programmable logic. The correlation processing of tracing shall be implemented internal to the logic analyzers or in external processors, in either case executing software to perform the correlation methods described in detail above.

Therefore it is also to be understood that because embodiments of the post processing algorithms may be implemented as one or more software programs, embodiments of these mechanisms may be implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    observing a sequence of timing calibration packets on a point-to-point link within a computing system having a network between components of said computing system, each of said timing calibration packets having timing calibration information that includes first clock cycle information and second clock cycle information, said first clock cycle information indicating when a respective timing calibration packet was ready to be transferred to a physical layer from a core region of a computing system component that transmitted said respective timing calibration packet, said second clock cycle information indicating when said respective timing calibration packet was actually transferred from said core region to said physical layer;
    recognizing a transfer pattern from amongst the timing calibration information of the observed sequence of timing calibration packets;
    observing non timing calibration packets on said point-to-point to link; and,
    determining when said non timing calibration packets were ready to be transferred to said physical layer based on said transfer pattern.

2. The method of claim 1 wherein said timing calibration packets were transmitted opportunistically on said point-to-point link such that said sequence of timing packets is characterized by spacings between consecutive timing calibration packets that are not fixed such that the occurrence of consecutive observed timing calibration packets is not at a fixed periodicity.

3. The method of claim 1 wherein said non timing calibration packets include any one or more of:
    a packet carrying a request for data;
    a packet carrying a request for instructions;
    a packet carrying data;
    a packet carrying instructions;
    a packet requesting a memory read;
    a packet requesting a memory write.

4. The method of claim 1 wherein said determining is based on a known gear ratio between a core clock frequency and a physical layer clock frequency of said computing system component.

5. The method of claim 1 wherein, as observed along said point-to-point link, said non timing calibration packets are between timing calibration packets.

6. The method of claim 1 wherein said network includes a router.

7. A semiconductor chip, comprising:
    core circuitry to be clocked by a first clock;
    physical layer circuitry to be clocked by a second clock;
    logic circuitry to stamp timing calibration information into an outgoing packet, said timing calibration information including first clock cycle information and second clock cycle information, said first clock cycle information indicating when said outgoing packet was ready to be transferred to said physical layer circuitry from said core circuitry, said second clock cycle information indicating when said outgoing packet was actually transferred from said core circuitry to said physical layer circuitry.

8. The semiconductor chip of claim 7 wherein said outgoing packet is opportunistically transmitted from said physical layer circuitry.

9. The semiconductor chip of claim 7 further comprising a queue between said core circuitry and said physical layer circuitry.

10. The semiconductor chip of claim 7 further comprising second logic circuitry to stamp into said outgoing packet second timing calibration information taken from a packet received by said physical layer circuitry.

11. The semiconductor chip of claim 7 wherein said physical layer circuitry is to interface to a network that interconnects different components of a computing system.

12. The semiconductor chip of claim 7 wherein said logic circuitry includes a counter to count clock cycles.

13. A computing system, comprising:
    a plurality of components interconnected by a network having a router, at least one of said components including:
    i) core circuitry to be clocked by a first clock;
    ii) physical layer circuitry to be clocked by a second clock;
    iii) logic circuitry to stamp timing calibration information into an outgoing packet, said timing calibration information including first clock cycle information and second clock cycle information, said first clock cycle information indicating when said outgoing packet was ready to be transferred to said physical layer circuitry from said core circuitry, said second clock cycle information indicating when said outgoing packet was actually transferred from said core circuitry to said physical layer circuitry.

14. The computing system of claim 13 wherein said outgoing packet is opportunistically transmitted from said physical layer circuitry.

15. The computing system of claim 13 further comprising a queue between said core circuitry and said physical layer circuitry.

16. The computing system of claim 13 further comprising second logic circuitry to stamp into said outgoing packet second timing calibration information taken from a packet received by said physical layer circuitry.

17. The computing system of claim 13 wherein said physical layer circuitry is to interface to a network that interconnects different components of a computing system.

18. The computing system of claim 13 wherein said logic circuitry includes a counter to count clock cycles.

19. The computing system of claim 18 further comprising test equipment coupled to link downstream from a component of said computing system having i), ii) and iii) above.

20. The computing system of claim 19 wherein said test equipment is to perform the following method:
    observe a sequence of packets on said link having respective instances of said timing calibration information;

recognize a transfer pattern from amongst the timing calibration information of the observed sequence of the packets;
observe packets without timing calibration information on said link; and,
determine when said packets without timing calibration information were ready to be transferred to said physical layer based on said transfer pattern.

* * * * *